(12) United States Patent
Black et al.

(10) Patent No.: US 12,370,778 B2
(45) Date of Patent: Jul. 29, 2025

(54) AUTOMOTIVE GLAZING FOR ADAS CAMERA SYSTEMS

(71) Applicant: Vitro Automotive Holdings Corporation, Cheswick, PA (US)

(72) Inventors: Lauren Black, Apollo, PA (US); DeWitt Lampman, Allison Park, PA (US); Robert George Sims, Clarkston, MI (US)

(73) Assignee: Vitro Automotive Holdings Corporation, Cheswick, PA (US)

( * ) Notice: Subject to any disclaimer, the term of this patent is extended or adjusted under 35 U.S.C. 154(b) by 412 days.

(21) Appl. No.: 17/006,063

(22) Filed: Aug. 28, 2020

(65) Prior Publication Data

US 2021/0060906 A1 Mar. 4, 2021

Related U.S. Application Data

(60) Provisional application No. 62/894,027, filed on Aug. 30, 2019.

(51) Int. Cl.
| | |
|---|---|
| *B32B 17/10* | (2006.01) |
| *B32B 3/02* | (2006.01) |
| *B32B 3/26* | (2006.01) |
| *B32B 7/12* | (2006.01) |
| *B60R 1/30* | (2022.01) |
| *B60R 11/04* | (2006.01) |

(52) U.S. Cl.
CPC .......... *B32B 17/10165* (2013.01); *B32B 3/02* (2013.01); *B32B 3/26* (2013.01); *B32B 3/266* (2013.01); *B32B 7/12* (2013.01); *B32B 17/10045* (2013.01); *B32B 17/10119* (2013.01); *B32B 17/10752* (2013.01); *B32B 17/10761* (2013.01); *B60R 1/30* (2022.01); *B60R 11/04* (2013.01); *B32B 2307/412* (2013.01); *B32B 2605/006* (2013.01); *Y10T 428/24273* (2015.01)

(58) Field of Classification Search
CPC .. B32B 3/02; B32B 3/26; B32B 3/266; B32B 17/10036; B32B 17/10045; B32B 17/10165; B32B 17/10119; B32B 17/10752; B32B 17/10761; B32B 2307/412; B32B 2605/006; B60R 1/30; B60R 11/04; B60J 1/001
See application file for complete search history.

(56) References Cited

U.S. PATENT DOCUMENTS

| | | |
|---|---|---|
| 8,013,780 B2 | 9/2011 | Lynam |
| 8,072,686 B2 | 12/2011 | Cui et al. |
| 8,164,543 B2 | 4/2012 | Cui et al. |
| 2003/0224182 A1 | 12/2003 | Simpson et al. |
| 2007/0216768 A1 | 9/2007 | Smith et al. |

(Continued)

FOREIGN PATENT DOCUMENTS

| | | |
|---|---|---|
| GB | 2271139 A | 4/1994 |
| JP | S52-037917 A | 3/1977 |

(Continued)

*Primary Examiner* — Catherine A. Simone
(74) *Attorney, Agent, or Firm* — The Webb Law Firm

(57) ABSTRACT

An automotive glazing that provides a portal (32) for receiving infrared radiation and an automotive glazing (40, 50) that defines an open pathway for infrared radiation between an infrared camera on one side of the glazing and a camera field of view on the other side of the glazing.

7 Claims, 7 Drawing Sheets

(56) References Cited

U.S. PATENT DOCUMENTS

| | | | |
|---|---|---|---|
| 2011/0027515 A1 | 2/2011 | Melcher et al. | |
| 2015/0253486 A1 | 9/2015 | Verger et al. | |
| 2019/0023106 A1 | 1/2019 | Gagliardi et al. | |
| 2019/0061481 A1 | 2/2019 | Kagaya et al. | |
| 2019/0389181 A1 * | 12/2019 | Hennion | B32B 7/12 |
| 2019/0389383 A1 | 12/2019 | Yajima et al. | |
| 2022/0032741 A1 * | 2/2022 | Yeh | B60J 1/001 |

FOREIGN PATENT DOCUMENTS

| | | | | |
|---|---|---|---|---|
| JP | 2018125298 A1 | 8/2018 | | |
| JP | WO2017188415 A1 | 3/2019 | | |
| JP | 2019-509956 A | 4/2019 | | |
| WO | 2016/208370 A1 | 12/2016 | | |
| WO | 2017115074 A1 | 7/2017 | | |
| WO | WO-2018142078 A1 * | 8/2018 | | B32B 17/061 |
| WO | 2018/168469 A1 | 9/2018 | | |
| WO | WO-2019105855 A1 * | 6/2019 | | B23K 26/0624 |

\* cited by examiner

AUTOMOTIVE GLAZING FOR ADAS CAMERA SYSTEMS

RELATED APPLICATIONS

This application claims priority to U.S. Provisional Patent Application No. 62/894,027 filed Aug. 30, 2019, which is incorporated herein in its entirety.

BACKGROUND OF THE INVENTION

Scope of the Invention

The presently disclosed invention concerns automotive glazings and, more particularly, automotive glazings that are compatible with infrared cameras of the types that may be used in automotive night vision systems.

Discussion of the Prior Art

The prior art has suggested the use of night vision systems that are based on images developed by infrared ("IR") cameras. In general, an infrared camera is a device capable of detecting the infrared radiation signature of an object and converting that signature into an electronic or electrical signal. The camera then processes that signal to produce an image that corresponds to the variance of the detected infrared illumination. Such cameras are often associated with personal vision equipment such as the type used by military personnel to enable them to see better in nocturnal environments. U.S. Pat. No. 8,164,543 shows an example of an automotive glazing that is compatible with an IR automotive night vision system that uses infrared sensors to identify or interpret objects according to infrared patterns. Sometimes, IR cameras are described as responsive to a "heat signature" because infrared energy is an indicator of thermal conditions.

In its common embodiment, the infrared camera comprises an array of sensors that are responsive to infrared energy within certain respective wavelengths. The sensor array is combined such that, as a whole, it is responsive to energy within a given portion or band of the infrared spectrum. Typically, night vision systems of a thermographic type are sensitive to radiation with wavelengths in the range of 8 to 15 µm.

A difficulty with the use of thermographic type infrared cameras when applied in connection with automotive glazings is that glass is opaque to the wavelengths of infrared illumination. This means that cameras of the thermographic type operating at long wave IR range and above do not have a field of vision that passes through the glass layers of the glazing.

The opaque property of glass with respect to infrared illumination has limited the applicability of night vision cameras to automotive glazings. However, there is a growing demand for automotive night vision systems. Reasons for such growing demand include the criticality of night vision systems for night driving owing to the opportunity for improved perception, acuity, and range of vision for night drivers. Another motivation is the increasing demand for autonomously operating vehicles.

Accordingly, there has been a need in the prior art for an automotive glazing that would enable the use of a night vision camera with automotive vehicles.

SUMMARY OF THE INVENTION

In accordance with the presently disclosed invention, an automotive glazing that is compatible with an IR camera includes a first transparency that defines an outer surface and an inner surface. The inner surface of the first transparency is oppositely disposed on the first transparency from the outer surface. The first transparency also has a perimeter edge between the inner and outer surfaces with the perimeter edge defining the outer perimeter of the first transparency. In addition, the first transparency also defines a portal between the inner surface and outer surface with the portal being located inside the perimeter edge of the first transparency. The automotive glazing of the presently disclosed invention also includes a second transparency. The second transparency also defines an outer surface and an inner surface with the inner surface being oppositely disposed on the second transparency from the outer surface. The second transparency is oriented with respect to the first transparency such that the inner surface of the second transparency faces the inner surface of the first transparency and at least a portion of the second transparency covers the portal of the first transparency. The material of the second transparency is selected from the group comprising zinc sulphide (ZnS) or polycarbonate (PC) material. Those materials enable long wave IR range and above cameras and LiDAR cameras to create a field of view through the transparencies of the glazing.

Also in accordance with the presently disclosed invention, the glazing may also include a third transparency. The third transparency also defines an outer surface and an inner surface that is oppositely disposed on the third transparency from the outer surface of the third transparency. The third transparency is oriented with respect to the first transparency such that the inner surface of the third transparency faces the inner surface of the first transparency while a portion of the outer surface of the third transparency faces a portion of the inner surface of the second transparency. The third transparency defines a portal inside the perimeter of the third transparency that coincides with the portal of the first transparency.

Preferably, the presently disclosed glazing also includes an interlayer that is located between the inner surface of the first transparency and the inner surface of the third transparency. The interlayer defines a portal that coincides with the portal of the third transparency and with the portal of the first transparency.

Also preferably, the second transparency covers the portal defined by the third transparency. The inner surface of the second transparency may be secured to the outer surface of the third transparency by a bonding agent or the second transparency may be secured to the first transparency by a subframe.

In addition, the presently disclosed invention includes a glazing wherein the perimeter of the first transparency includes a length that forms the top edge or uppermost edge of the transparency at times when the transparency is installed in a vehicle. The perimeter of the second transparency includes a length that forms the top edge or uppermost edge of the second transparency at times when the second transparency is installed in a vehicle. The top edge of the first transparency and the top edge of the second transparency each define respective concave contours that provide a pathway near the top of the glazing. Electromagnetic illumination propagates through the concave contour between the outer surface of the second transparency and the outer surface of the first transparency. In this way, IR radiation bypasses the transparencies of the glazing and propagates directly to the IR camera on the vehicle.

BRIEF DESCRIPTION OF THE DRAWINGS

A presently preferred embodiment of the disclosed invention is shown and described in connection with the accompanying drawings wherein.

DESCRIPTION OF PRESENTLY PREFERRED EMBODIMENTS

Figure 1:
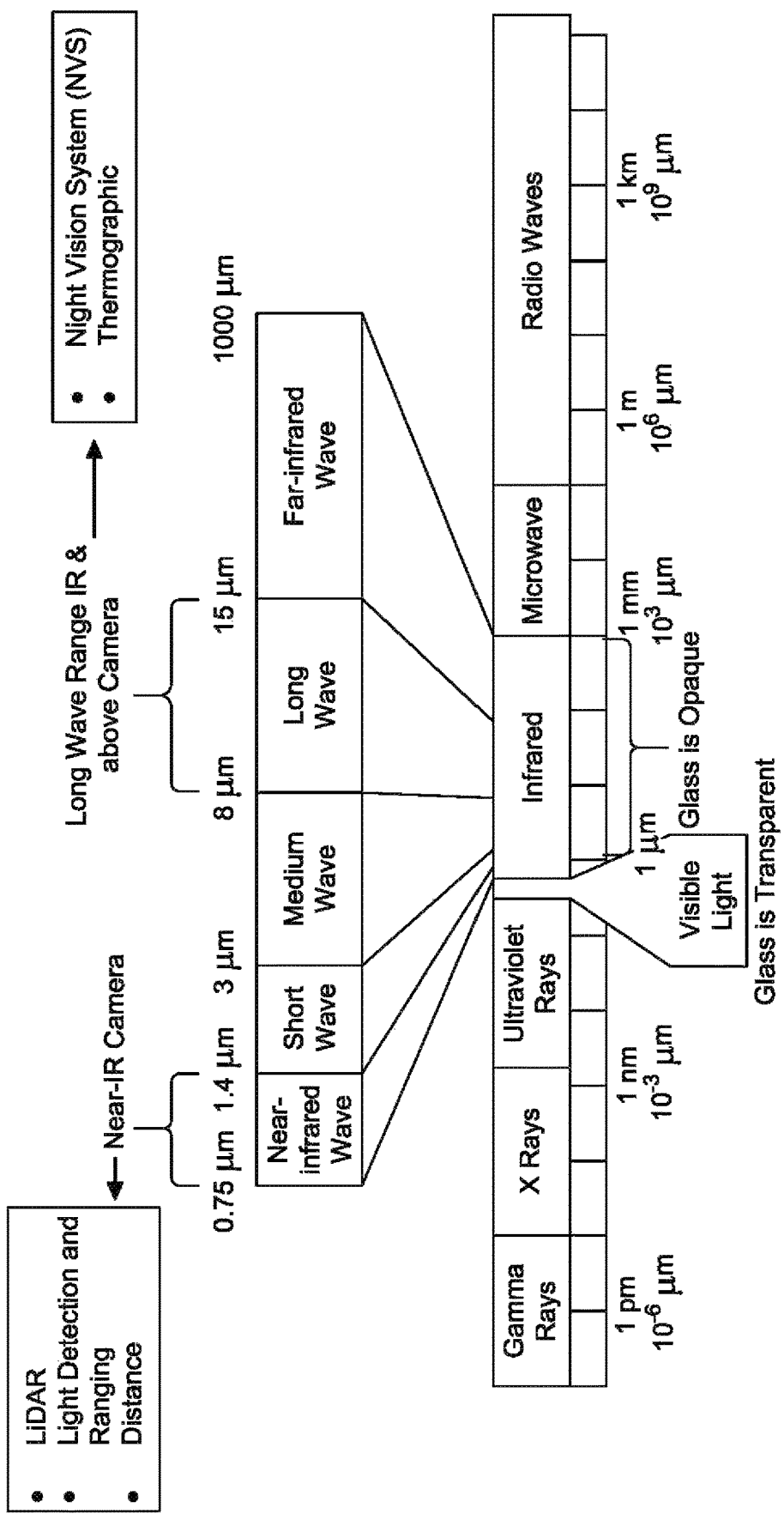
FIG. 1 is an illustration of the electromagnetic spectrum with an emphasis on the infrared spectrum.

The electromagnetic spectrum is generally illustrated in FIG. 1. FIG. 1 illustrates that the infrared spectrum generally includes electromagnetic energy with a wavelength in the range of 1 µm to 1 mm. Energy within this frequency range can be further separated into wavelength bands of far-infrared waveband (15 µm to 1000 µm); long waveband (8 µm to 15 µm); medium waveband (3 µm to 8 µm); short waveband (1.4 µm to 3 µm); and near-infrared waveband (0.75 µm to 1.4 µm). FIG. 1 further illustrates that long wave IR range and above cameras of the thermographic type typically operate in the long waveband of 8 µm to 15 µm while light detection and ranging cameras ("LiDAR") generally operate in the near-infrared waveband and a portion of the short waveband.

In one aspect of the presently disclosed embodiment, the glazing is provided with a lens that is substantially transparent to infrared radiation in the short and near-infrared wavebands. More specifically, the lens is made of glass in which the chemical composition of the glass provides approximately 92% transmission of IR radiation and less than 1% absorption of IR radiation.

Certain IR transparent glass is known for uses such as optical components of eyeglasses and microscopes. However, such types of IR transparent glass are not acceptable for use in automotive glazings due to their relatively high cost and size limitations for their manufacture.

In the presently disclosed invention, IR-transparent LiDAR capable glass is made of a soda-lime composition matrix that can be produced in float furnaces on an industrial scale. Further, the IR-transparent LiDAR capable glass is compatible with processes that are commonly employed with automotive glazings such as cutting, grinding, bending, tempering, lamination and coating.

Figure 2:
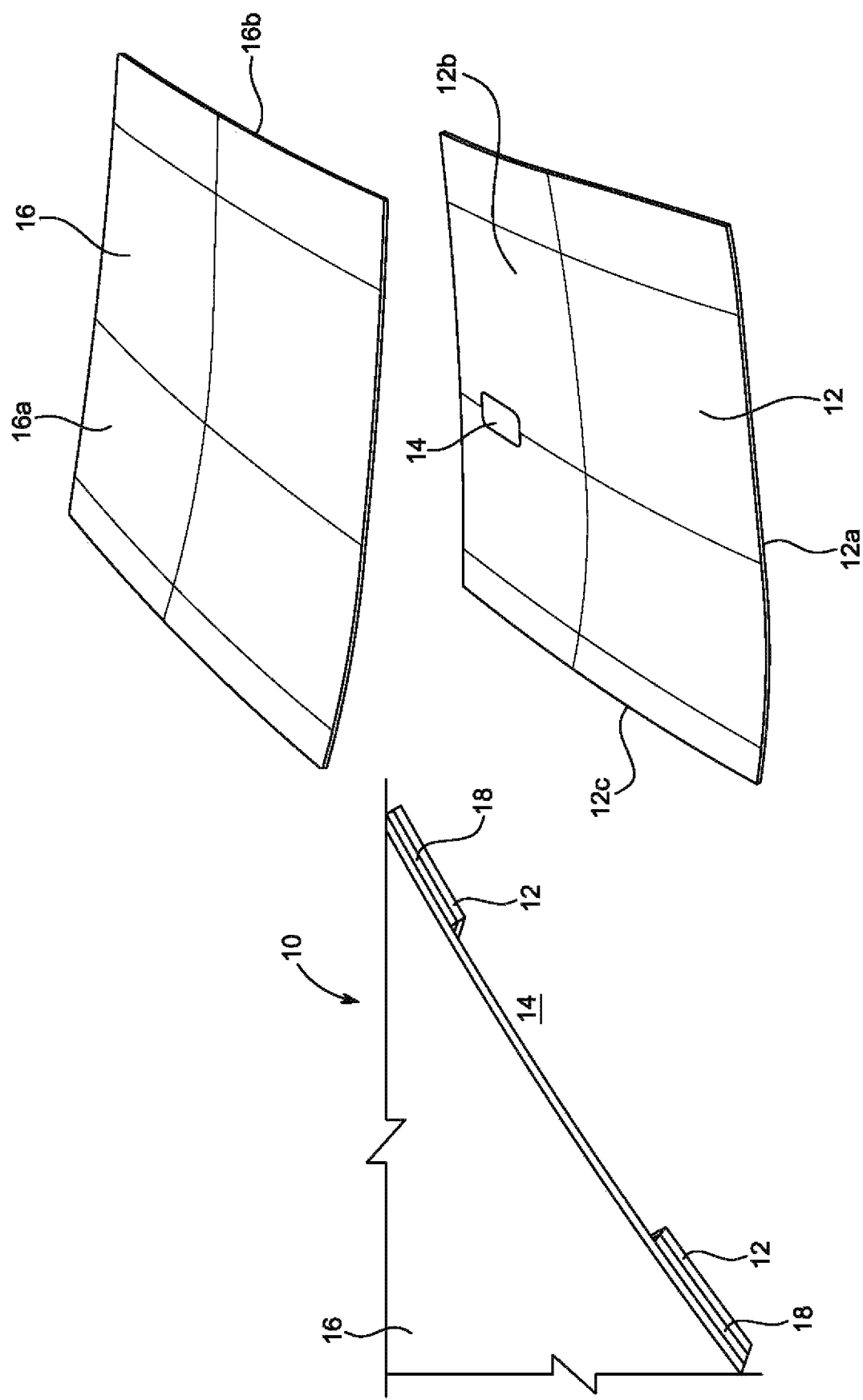
FIG. 2 shows an example of one presently preferred embodiment.

An example of an automotive glazing that incorporates the features of IR transparent glass in a glazing that is compatible with long wave IR range and above cameras is shown in FIG. 2. FIG. 2 shows the components of an automotive glazing 10 wherein a sheet of standard automotive glass (i.e. non-IR glass) 12 includes a portal 14. Sheet 12 is laminated to a sheet of IR glass 16 by a layer of PVB 18 or other laminate material. IR energy that illuminates IR glass 16 substantially transmits through IR glass 16, but the IR energy is blocked by sheet 12 except at portal 14. At portal 14, the IR illumination passes through the portal where it can then be sensed by a long wave IR range and above camera.

Stated more specifically, automotive glazing 10 is compatible with an IR camera. Glazing 10 includes a first transparency 12 that defines an outer surface 12a and an inner surface 12b. Inner surface 12b is oppositely disposed on first transparency 12 from outer surface 12a. First transparency 12 also has a perimeter edge 12c between inner and outer surfaces 12a and 12b with perimeter edge 12c defining the outer perimeter of first transparency 12. In addition, first transparency 12 also defines a portal 14 between inner surface 12b and outer surface 12a with portal 14 being located on first transparency 12 inside perimeter edge 12c. Glazing 10 also includes a second transparency 16. Second transparency 16 defines an outer surface 16a and an inner surface 16b with inner surface 16b being oppositely disposed on second transparency 16 from outer surface 16a. Second transparency 16 is oriented with respect to first transparency 12 such that inner surface 16b of second transparency 16 faces inner surface 12b of first transparency 12 and at least a portion of second transparency 16 covers portal 14 of first transparency 12. The material of second transparency 16 is selected from the group comprising zinc sulphide (ZnS) or polycarbonate (PC) material. Those materials enable long wave IR range and above cameras and LiDAR cameras to create a field of view through the transparencies of glazing 10.

An IR glass sheet 16 is relatively expensive compared to other automotive glass. In addition, an alternative ZnS lens that is described later herein is made of ZnS that is multicrystal and pressed to shape and then optically polished. Due to its method of manufacture, such ZnS lenses are not commercially available in sheet form. For that reason, it is preferred to limit the use of IR glass. As one example of limitation of the use of IR glass, FIG. 3 shows an alternative embodiment of the presently disclosed invention.

Figure 3:
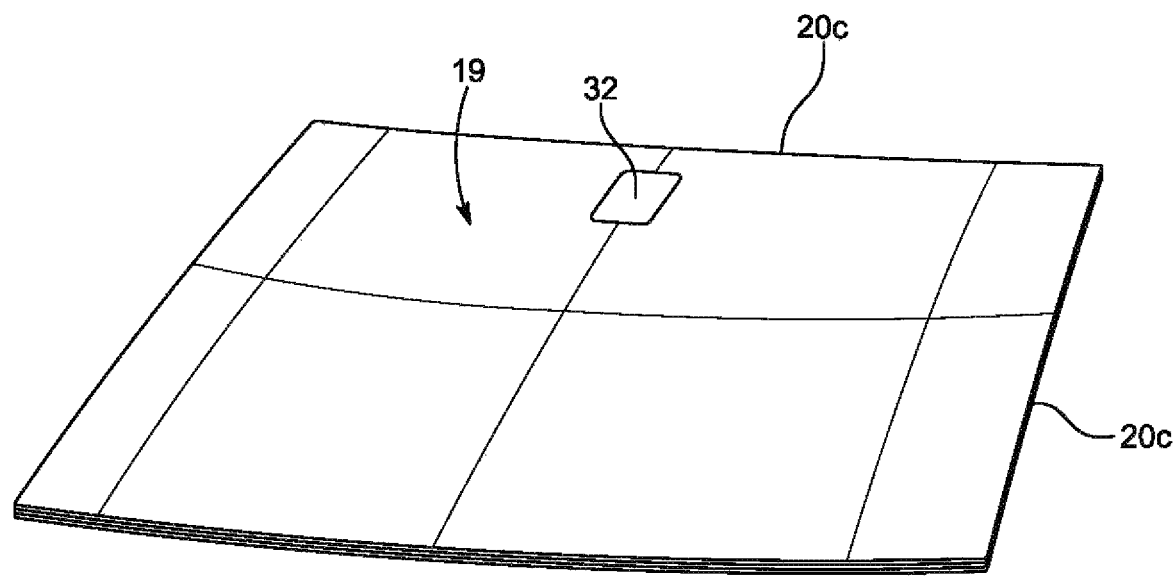
FIG. 3 shows another example of a presently preferred embodiment.
Figure 3:
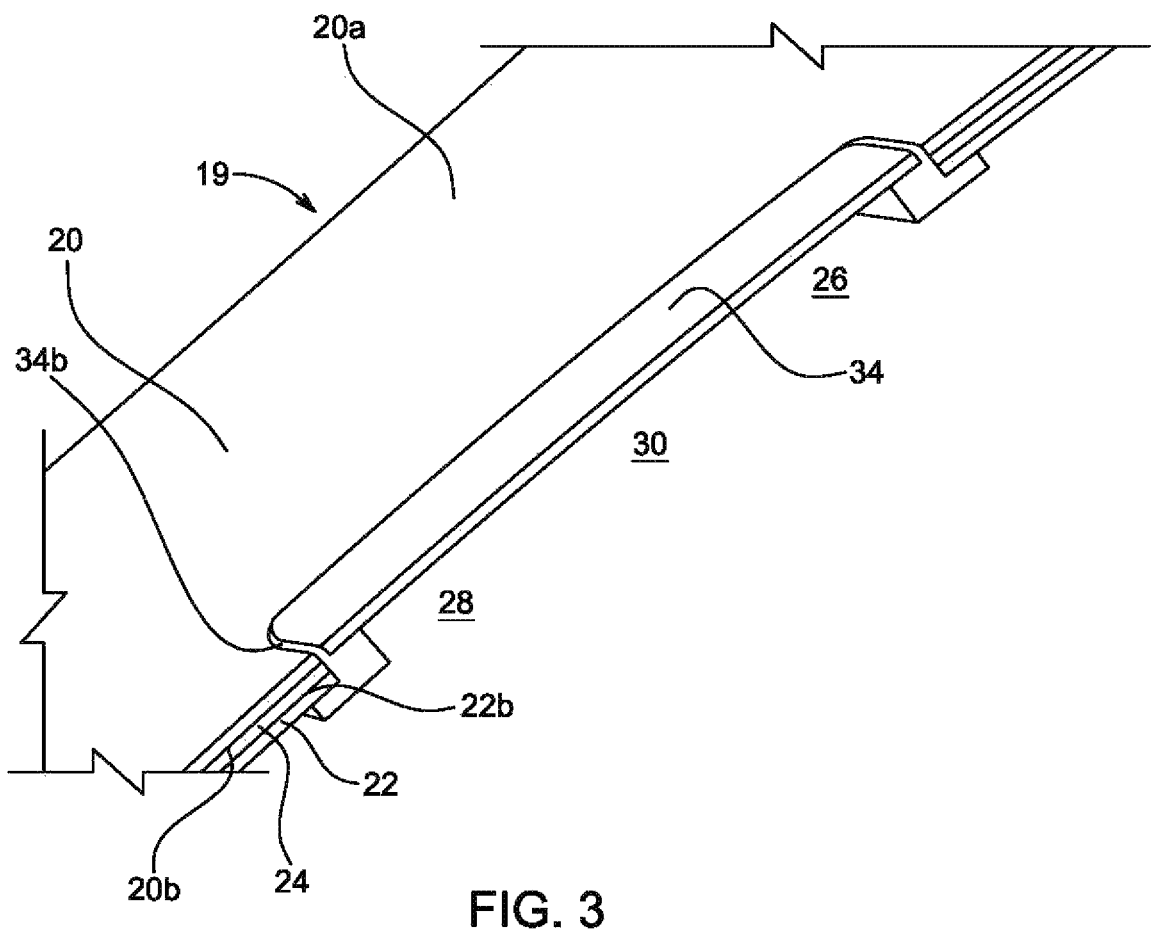

FIG. 3 shows a glazing 19 that includes an outer layer of automotive glass 20 and an inner layer of automotive glass 22. Layer 20 and layer 22 are laminated together with a sheet of PVB 24 or other laminate material. All three layers 20, 22 and 24 define a respective portal 26, 28 and 30 that are aligned to form an overall portal 32. The overall portal 32 is covered with a lens 34 of IR glass that is encapsulated within portal 32. The IR glass may, for example, be of a ZnS material.

More specifically, the embodiment of the presently disclosed invention may include a glazing 19 that includes a first transparency 22, a second transparency 34, and a third transparency 20. Third transparency 20 defines an outer surface 20a and an inner surface 20b that is oppositely disposed on third transparency 20 from outer surface 20a. Third transparency 20 is oriented with respect to first transparency 22 such that inner surface 20b of third transparency 20 faces inner surface 22b of first transparency 22 while a portion of outer surface 20a of third transparency 20 faces a portion of inner surface 34b of second transparency 34. Third transparency 20 defines a portal 26 inside the perimeter 20c of third transparency 20 that coincides with portal 28 of first transparency 22.

FIG. 3 also shows an interlayer 24 that is located between inner surface 22b of first transparency 22 and inner surface 20b of third transparency 20. Interlayer 24 defines a portal 30 that coincides with portal 26 of third transparency 20 and with portal 28 of first transparency 22.

Figure 4:
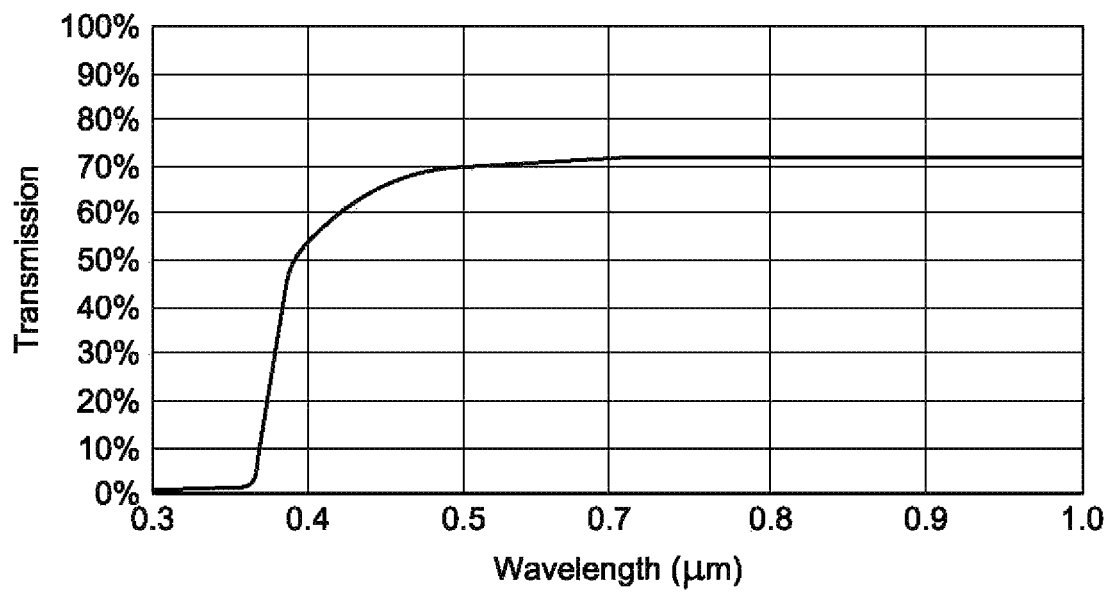
FIG. 4 is diagram of the transmissivity of ZnS as a function of the wavelength of electromagnetic illumination.
Figure 4:
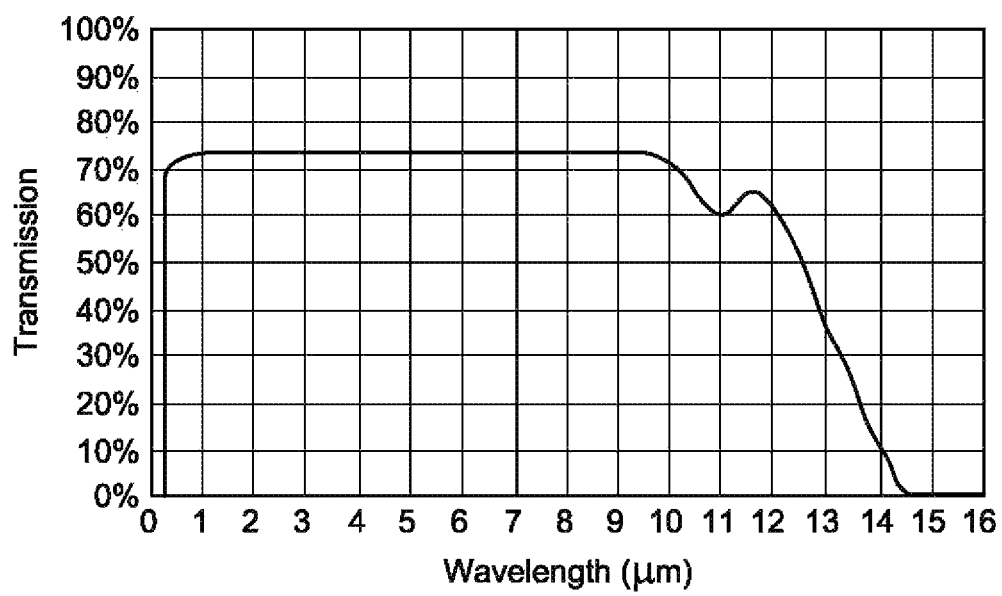

FIG. 4 shows the transmissivity of a ZnS lens as a function of wavelength. FIG. 4 shows that a ZnS lens has good transmissivity in the long waveband of 8 μm to about 12 μm.

Figure 5:
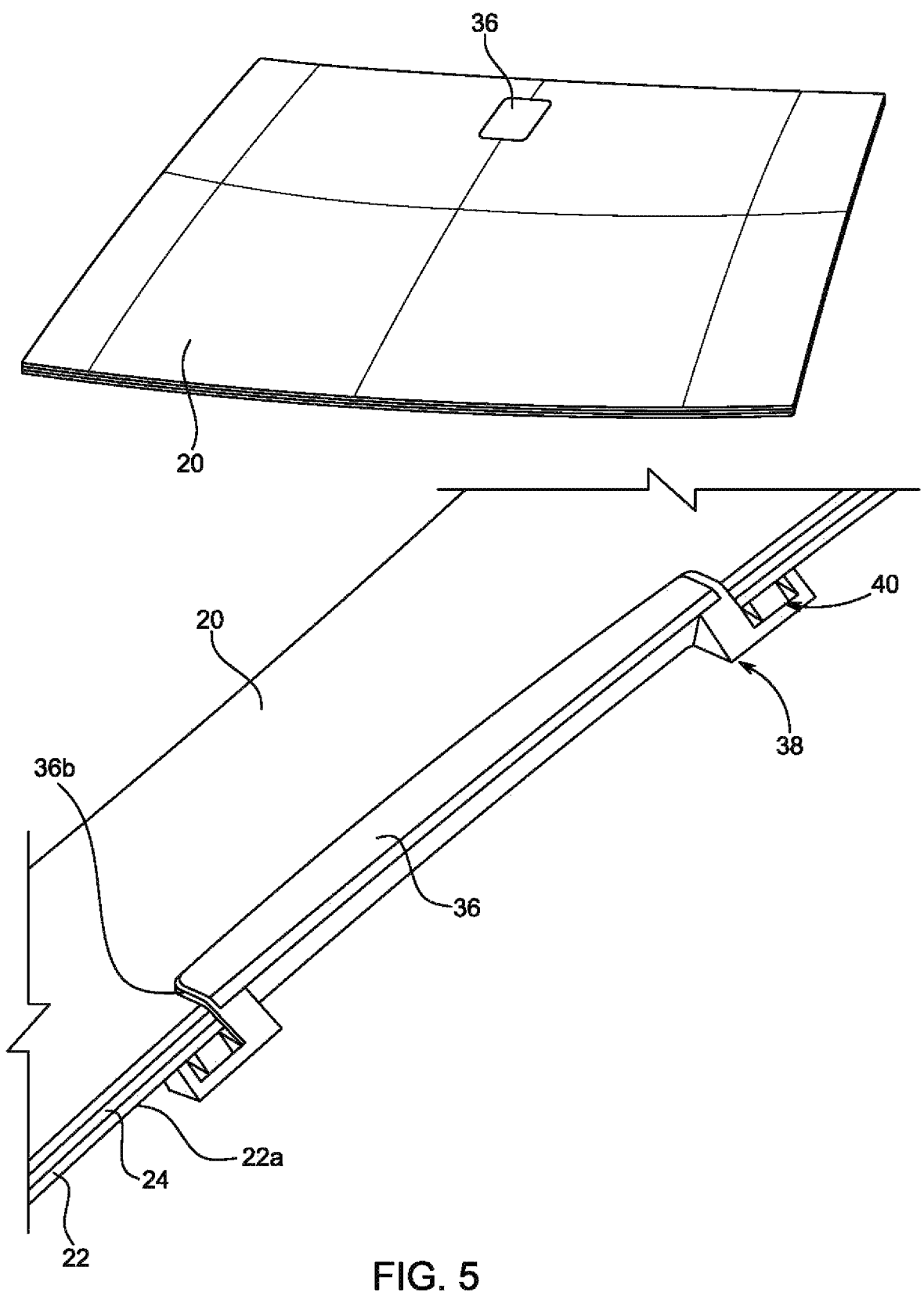
FIG. 5 shows another example of a presently preferred embodiment.

Another alternative embodiment of the presently disclosed invention is shown in FIG. 5. FIG. 5 is similar to the embodiment of FIG. 3. A ZnS type IR lens 36 in FIG. 5 is secured to the automotive glazing by a sub-frame 38 in combination with a ring of adhesive material 40. The embodiment of FIG. 5 is advantageous over the embodiment of FIG. 3 in that sub-frame 38 in FIG. 5 allows lens 36 to be more easily secured over the portal in the automotive glazing. This reduces the risk of misapplication and waste during the process of assembling the automotive glazing.

Explained further, the embodiment shown in FIG. 5 is a glazing similar to that of FIG. 3 wherein a second transparency 36 covers the portal 26 defined by third transparency 20. The inner surface 36b of second transparency 36 may be secured to outer surface 20a of third transparency 20 by a bonding agent such as illustrated in FIG. 3. Alternatively, second transparency 36 may be secured by a subframe 38 as illustrated in FIG. 5. Subframe 38 is secured to first transparency 22 near the edge of portal 28 of first transparency 22. Subframe 38 is also connected to second transparency 36 to maintain second transparency 36 in covering relationship with portal 28 of first transparency 22 and portal 26 of third transparency 20. In some cases, a seal 40 may be located between subframe 38 and outer surface 22a of first transparency 22.

Figure 6:
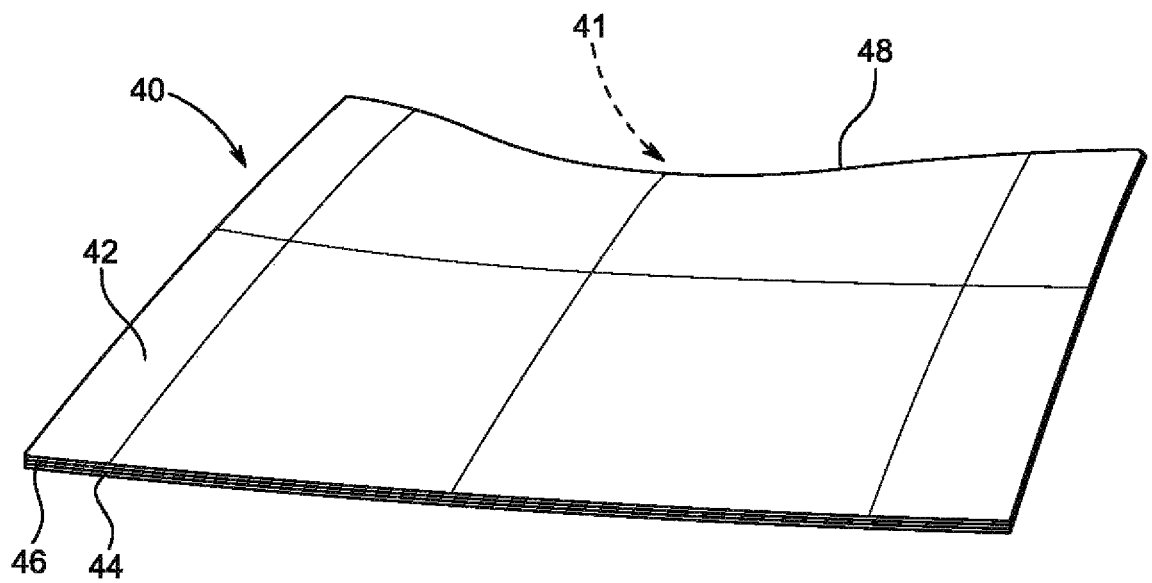
FIG. 6 shows another example of a presently preferred embodiment.
Figure 7:
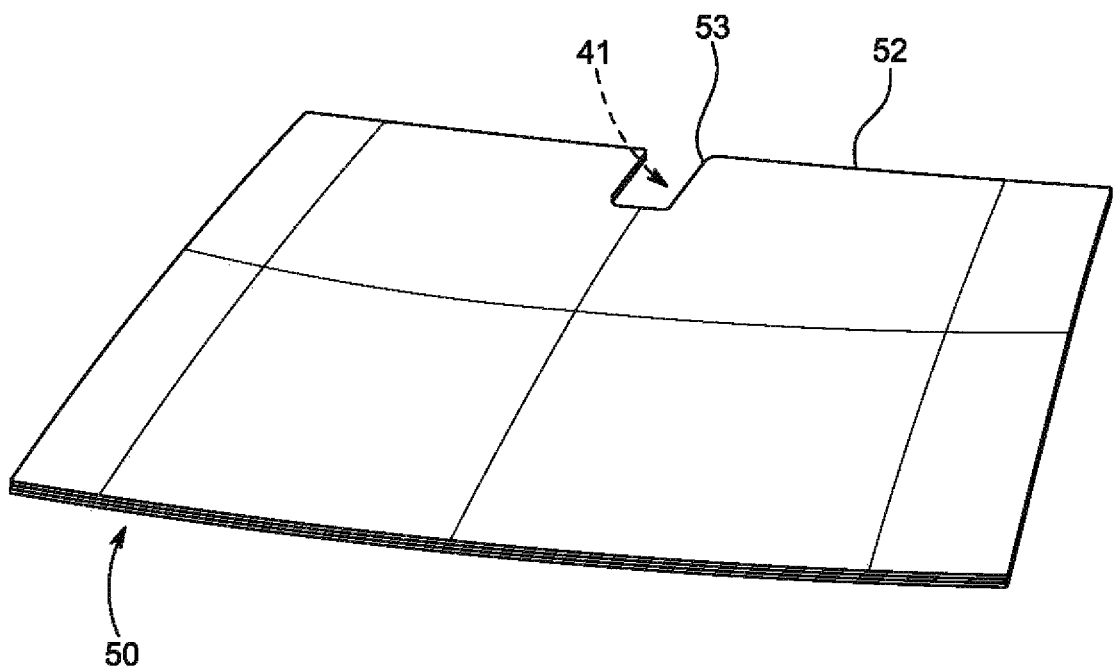
FIG. 7 shows another example of a presently preferred embodiment.

FIGS. 6 and 7 show a further alternative for establishing a field of view for an automotive IR camera that is free of opacity caused by glass obstructions. The embodiments of FIGS. 6 and 7 are compatible with both long wave IR range and above cameras and LiDAR type cameras because the radiation that is incident on the camera entirely avoids the automotive glazing. In FIGS. 6 and 7, the glazing laminate is formed such that it avoids the pathway for the camera's field of view. In addition to the edge contours that are depicted in the embodiments of FIGS. 6 and 7, other embodiments in which the upper edge of the glazing is contoured so as to avoid interfering with the field-of-view of the long wave IR range and above cameras and/or LiDAR cameras are also contemplated. In such embodiments, the upper edge of the glazing is contoured to be closer to the lower edge of the glazing near the middle portions of the glazing than at the corner portions of the glazing.

In FIG. 6, glazing 40 is formed of two sheets of automotive glass 42 and 44 that are laminated by a layer of PVB 46 or other laminate. The upper edge 48 of glazing 40 is formed in a concave manner such that an array of IR sensors of an IR camera can be positioned above the concave edge of the glazing. In FIG. 7, glazing 50 is formed of two sheets of automotive glass as in FIG. 6 and the upper edge 52 of glazing 50 is notched so that an IR camera of an automotive night vision system can be located behind the notch 53 in the upper edge 52. In both embodiments of FIG. 6 and FIG. 7, the IR illumination to the array of an IR camera of a night vision system is not blocked by the glass of the automotive glazing.

FIG. 7 illustrates that the concave form of the top edge of the glazing may have various concave shapes and that the term concave is used herein to describe the presently disclosed invention is intended as a general description and not in a mathematical sense. FIG. 7, illustrates that a glazing 50 may have a top edge 52 with a notch 53 that embodies the concave shape.

Figure 8:
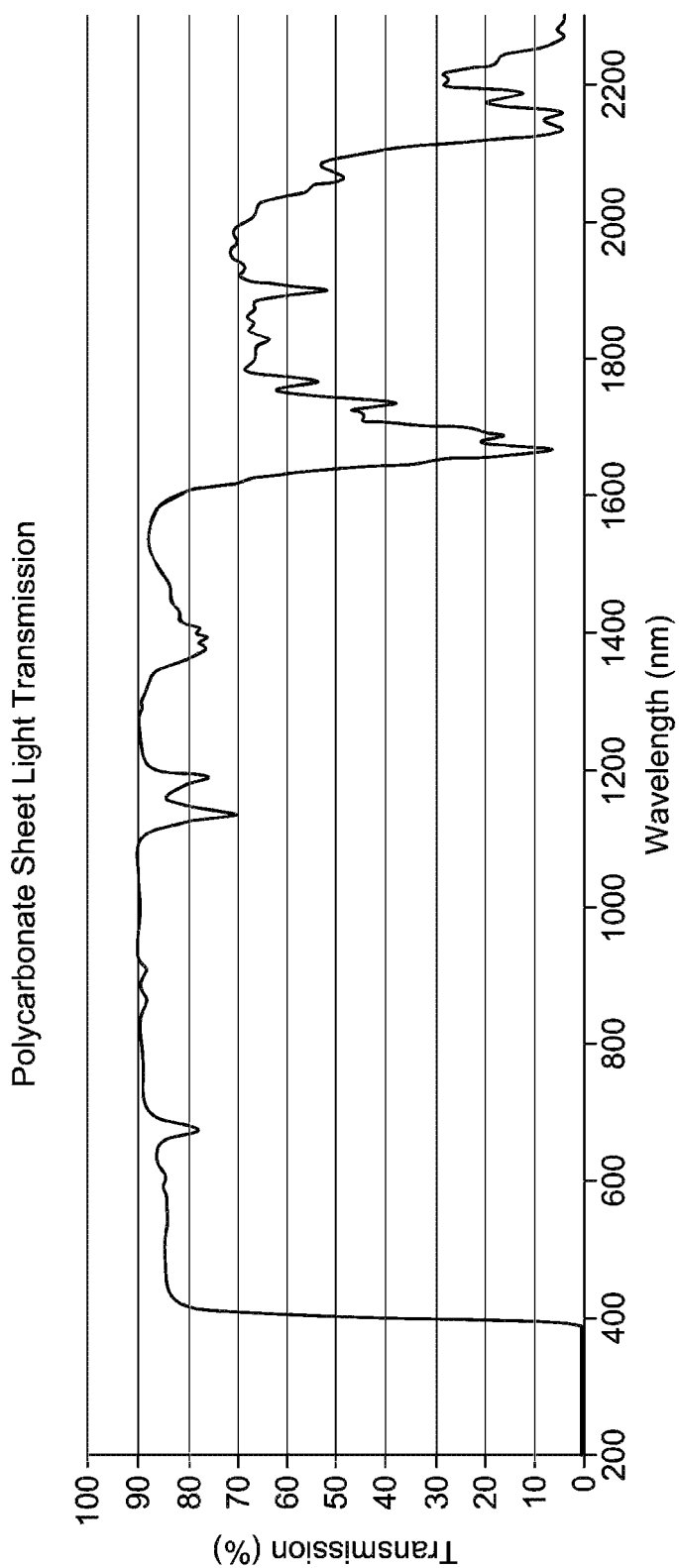
FIG. 8 is a diagram of the transmissivity of polycarbonate as a function of the wavelength of electromagnetic illumination.

As another alternative embodiment, the IR transmissive material can be other than ZnS. For example, FIG. 8 shows light transmissivity of a polycarbonate material ("PC") as a function of the wavelength of the illuminating radiation. FIG. 8 shows that the PC material maintains a high degree of transmissivity in the range of 400 nm to 1500 nm and another relatively high transmissivity in the range of 1800 nm to 2000 nm. An example of such polycarbonate material is commercially available from Sheffield Plastics, Inc. under the trademark Makrolon®.

A lens made of PC with transmissivity such as shown in FIG. 8 can be substituted for the ZnS lens that is shown in FIGS. 3 and 5. Such a combination has an advantage that it would be compatible with IR cameras that operate in the long waveband that is described in connection with FIG. 1.

As another alternative embodiment, the ZnS and PC lenses that are described in connection with FIGS. 3 and 5 can also be modified to make that construction suited for use with light detection and ranging cameras ("LiDAR cameras"). LiDAR cameras typically are responsive to infrared illumination in the near-infrared waveband (0.75 μm to 1.4 μm) and a portion of the short waveband (1.4 μm to 3 μm). Conventional automotive glazings are generally not opaque to IR radiation in this wavelength band, but it has been found that the imaging and ranging capability of LiDAR cameras can be improved when the transmissivity of the automotive glass is relatively high.

Accordingly, substituting a lens of high transmissivity glass for the ZnS and PC lenses that are described in connection with FIGS. 3 and 5 provides a glazing in which a LiDAR camera can view through the lens of high transmissivity glass to process data for developing image and range information. Examples of such glass include glass in which transmissivity is high in the near-infrared waveband and in the lower wavelength portion of the short waveband. An example of such glass is sold under the tradename Solarphire PV™. To increase the transmissivity of Solarphire PV glass even further, an antireflective coating may be applied to the glass that is designed specifically to increase transmittance at the operating wavelength of the LiDAR laser.

What is claimed:

1. A glazing for use in vehicles that include a sensing device of a type that is responsive to electromagnetic radiation, said glazing comprising:

a first transparency that defines an outer surface and an inner surface, said inner surface of said first transparency being oppositely disposed on said first transparency from said outer surface, said first transparency having a perimeter edge between said inner surface and said outer surface, said perimeter edge defining the outer perimeter of said first transparency, said first transparency also further defining a portal between said inner surface of said first transparency and said outer surface of said first transparency and inside the perimeter edge of said first transparency;

a second transparency that defines an outer surface and an inner surface, said inner surface of said second transparency being oppositely disposed on said second transparency from said outer surface of said second transparency, said second transparency being oriented with respect to said first transparency such that said inner surface of said second transparency faces said inner surface of said first transparency, at least a portion of said second transparency covering the portal of said first transparency;

a third transparency that defines an outer surface and an inner surface that is oppositely disposed on said third transparency from said outer surface of said third transparency, said third transparency being oriented with respect to said first transparency such that said inner surface of said third transparency faces the inner surface of said first transparency and a portion of the outer surface of said third transparency faces a portion of the inner surface of said second transparency, said third transparency defining a portal that coincides with the portal of said first transparency; and an interlayer that is located between the inner surface of said first transparency and the inner surface of said third transparency, said interlayer defining a portal that coincides with the portal of said third transparency and with the portal of said first transparency; and a subframe that is secured to said first transparency near the edge of the portal of said first transparency, said subframe also being connected to said second transparency to maintain said second transparency in covering relationship with the entire portal of said first transparency and the entire portal of the third transparency.

2. The glazing of claim 1 further comprising a seal that is located between said subframe and the outer surface of said first transparency.

3. The glazing of claim 1, wherein the inner surface of said second transparency is secured to the outer surface of said third transparency by a bonding agent.

4. A glazing for use in vehicles that include a sensing device of a type that is responsive to electromagnetic radiation, said glazing comprising:

a first transparency that defines an outer surface and an inner surface, said inner surface of said first transparency being oppositely disposed on said first transparency from said outer surface, said first transparency having a perimeter edge between said inner surface and said outer surface, said perimeter edge defining the outer perimeter of said first transparency, said first transparency also further defining a portal between said inner surface of said first transparency and said outer surface of said first transparency and inside the perimeter edge of said first transparency;

a second transparency that defines an outer surface and an inner surface, said inner surface of said second transparency being oppositely disposed on said second transparency from said outer surface of said second transparency, said second transparency being made of zinc sulfide and oriented with respect to said first transparency such that said inner surface of said second transparency faces said inner surface of said first transparency, at least a portion of said second transparency covering the portal of said first transparency;

a third transparency that defines an outer surface and an inner surface that is oppositely disposed on said third transparency from said outer surface of said third transparency, said third transparency being oriented with respect to said first transparency such that said inner surface of said third transparency faces the inner surface of said first transparency and a portion of the outer surface of said third transparency faces a portion of the inner surface of said second transparency, said third transparency defining a portal that extends between said inner surface of said third transparency and said outer surface of said third transparency, said portal of said third transparency coinciding with the portal of said first transparency; and a subframe that is secured to said first transparency near the edge of the portal of said first transparency, said subframe also being connected to said second transparency to maintain said second transparency in covering relationship with the entire portal of said first transparency and the entire portal of the third transparency.

5. The glazing of claim 4 further comprising an interlayer that is located between the inner surface of said first transparency layer and the inner surface of said third transparency layer, said interlayer defining a portal that coincides with the portal of said third transparency and with the portal of said first transparency.

6. The glazing of claim 4 wherein the inner surface of said second transparency is secured to the outer surface of said third transparency by a bonding agent.

7. The glazing of claim 4 further comprising a seal that is located between said subframe and the outer surface of said first transparency.

* * * * *